US007624253B2

(12) United States Patent
Begon et al.

(10) Patent No.: US 7,624,253 B2
(45) Date of Patent: Nov. 24, 2009

(54) DETERMINING REGISTER AVAILABILITY FOR REGISTER RENAMING

(75) Inventors: Florent Begon, Antibes (FR); Cedric Denis Robert Airaud, Saint Laurent du Var (FR); Norbert Bernard Eugene Lataille, Le Cannet (FR); Melanie Vincent, Grasse (FR)

(73) Assignee: ARM Limited, Cambridge (GB)

( * ) Notice: Subject to any disclaimer, the term of this patent is extended or adjusted under 35 U.S.C. 154(b) by 174 days.

(21) Appl. No.: 11/586,007

(22) Filed: Oct. 25, 2006

(65) Prior Publication Data

US 2008/0114966 A1   May 15, 2008

(51) Int. Cl.
*G06F 9/30* (2006.01)
(52) U.S. Cl. ...................................... 712/216
(58) Field of Classification Search .................. 712/216, 712/218, 219, 239
See application file for complete search history.

(56) References Cited

U.S. PATENT DOCUMENTS

| | | | | |
|---|---|---|---|---|
| 5,694,564 A * | 12/1997 | Alsup et al. | ............... | 712/216 |
| 5,796,973 A * | 8/1998 | Witt et al. | ............... | 712/208 |
| 5,832,260 A * | 11/1998 | Arora et al. | ............... | 712/239 |
| 6,356,918 B1 * | 3/2002 | Chuang et al. | ............... | 707/203 |
| 6,633,970 B1 * | 10/2003 | Clift et al. | ............... | 712/217 |
| 6,748,519 B1 * | 6/2004 | Moore | ............... | 712/217 |
| 6,845,442 B1 * | 1/2005 | Lepak et al. | ............... | 712/214 |
| 7,024,537 B2 * | 4/2006 | Pickett et al. | ............... | 711/217 |
| 7,028,166 B2 * | 4/2006 | Pickett | ............... | 712/216 |
| 7,089,400 B1 * | 8/2006 | Pickett et al. | ............... | 711/217 |
| 7,222,226 B1 * | 5/2007 | Lepak et al. | ............... | 712/225 |
| 2004/0143721 A1 * | 7/2004 | Pickett et al. | ............... | 711/217 |
| 2004/0168045 A1 * | 8/2004 | Morris et al. | ............... | 712/225 |
| 2004/0177236 A1 * | 9/2004 | Pickett | ............... | 712/225 |
| 2004/0177239 A1 * | 9/2004 | Clift et al. | ............... | 712/228 |
| 2005/0247774 A1 * | 11/2005 | Sander et al. | ............... | 235/375 |

* cited by examiner

*Primary Examiner*—Aimee J Ll
(74) *Attorney, Agent, or Firm*—Nixon & Vanderhye P.C.

(57) ABSTRACT

A data processing apparatus 2 supports out-of-order processing register renaming using a renaming stage 8. A set of physical registers 16 is mapped to architectural registers. Available-register identifying logic 26 is used to identify which physical registers 16 are available for use by the renaming stage 8. The available-register identifying logic 26 includes an instruction FIFO 28 storing register mapping data for unresolved instructions and indicating physical registers 16 storing data values which may be required in association with those unresolved speculative instructions. The speculative instructions may be predicted branch instructions, load/store instructions, conditional instructions or other types of instruction.

23 Claims, 6 Drawing Sheets

DETERMINING REGISTER AVAILABILITY FOR REGISTER RENAMING

BACKGROUND OF THE INVENTION

1. Field of the Invention

This invention relates to the field of data processing systems. More particularly, this invention relates to data processing systems in which register renaming is used.

2. Description of the Prior Art

It is known to provide data processing systems which incorporate register renaming mechanisms. In such systems, program instructions include register specifiers identifying particular architectural registers when viewed from a programmer's model point of view. In order to facilitate higher performance operation, such as, for example, support for out-of-order execution (either at issue or writeback) or long pipelines, it is known to utilize register renaming whereby a larger pool of physical registers are actually provided by the microprocessor than are present within the programmer's model view of the microprocessor. This larger pool of physical registers enables hazards such as write-after-write (WAW) hazards to be avoided. Thus, whilst a program instruction may specify a particular architectural register to be used, register renaming mechanisms within the processor map this to a physical register which can be different from the physical register to which another program instruction specifying the same architectural register is mapped. Thus, the execution of the two program instructions specifying the same architectural register may be facilitated by use of different physical registers within the processor. The register renaming mechanism of known systems keeps track of which physical registers have been mapped to which architectural registers, if appropriate, and the relative ordering of the program instructions within the original program flow so that the proper behaviour and processing results are ensured.

Whilst register renaming is a powerful technique for enabling higher performance operation, it brings with it many associated practical difficulties and complexities. When an architectural register is to be mapped to a physical register it is necessary to identify which of the physical registers is available to be used for such a mapping. It is relatively straight forward to avoid WAW hazards in such a selection by keeping track of which physical register holds the latest value for an architectural registers and not overwriting such a physical register. However, avoiding write after read (WAR) hazards is more difficult. Such WAR hazards arise when a physical register is overwritten with a value from an architectural registers due to a new mapping whilst the original value stored in that physical register has still to be read by a pending instruction. If such a WAR hazard arises, then the pending instruction will read an incorrect value from the physical register since the value it was properly to read will have been overwritten. The read can take place at various timings after issue and this makes tracking pending reads difficult.

Two basic solutions can be envisaged for such a problem. One solution is to merge information from all pipeline stages holding pending instructions to identify registers for those pending instructions that have not yet been read. This requires a combinatorial logic path decoding all unread registers from all pipeline stages after register renaming (including any as yet unissued instructions) to a structure such as a large bit field with an entry for each physical register. This bit field could then be used to identify physical registers available for remapping. This solution is disadvantageous both in terms of the gate count needed to support such a mechanism and the extra power consumption needed to operate such a mechanism.

Another possible approach is to associate a counter with each physical register with this counter being incremented each time the physical register is referenced (i.e. an instruction issued which will require it to be read) and then decremented when that physical register is actually read. Thus, the counter keeps a record of how many pending reads there are for each physical register and only physical registers for which there are no pending reads will be made available for mapping.

This solution again has significant practical disadvantages, such as it is difficult to fix a size for the counters to be used since this will effectively place a limit on the number of times a register can be requested consecutively for a read. The counter will also need to be able to deal with incrementing and decrementing the counter by a number that depends upon the number of read ports activated at the same time for the same physical register, i.e. the physical register bank may have multiple read ports and in any given read cycle a physical register may be subject to more than one read. Thus, whilst such an approach might seem superficially attractive, it again has the disadvantage of requiring significant gate count and complexity overhead with an associated disadvantageous increase in power consumption.

SUMMARY OF THE INVENTION

Viewed from one aspect the present invention provides apparatus for processing data, said apparatus comprising:

a physical set of registers;

register renaming circuitry for mapping from register specifiers of an architectural set of register specifiers to registers of said physical set of registers, said architectural set of register specifiers representing registers as specified by instructions within an instruction set and said physical set of registers being physical registers for processing instructions of said instruction set; and available-register identifying circuitry responsive to a current state of said apparatus to identify which physical registers of said physical set of registers are available to be mapped by said register renaming circuitry to a register specifier of an instruction to be processed; wherein said available-register identifying circuitry includes an instruction memory storing register mapping data indicative of register mappings used by instructions that are issued so as to identify physical registers storing values still required for at least some outcomes of said instructions, said register mapping data for an instruction being kept in said memory if said instruction is one or more of an unresolved speculative instruction and yet to read one or more registers.

The present technique recognizes that in practice the problem of identifying physical registers subject to pending read operations, and accordingly unavailable for reuse, can be handled by mechanisms already provided to deal with speculative instructions. Speculative instructions are allowed to execute and modify registers (using renaming techniques) before those speculative instructions are resolved (i.e. determined as being properly executed). Accordingly, an instruction memory is provided to store recovery data so that unwanted changes made by an incorrectly executed speculative instruction can be reversed. As an example, a conditional branch instruction may be encountered and a branch prediction made with instructions from the predicted branch target then be speculatively executed. Whilst branch prediction mechanisms seek to make accurate predictions, nevertheless there is a finite misprediction rate at which point speculative instructions which have been issued for execution are no longer required and any changes they have made need to be reversed by stored recovery data. Other examples of speculative instructions include load/store instructions which may give rise to a data abort and so not be properly executed.

Having identified speculative instructions as requiring specific handling, the present technique provides a solution to WAR hazards by using a common instruction memory to store register mapping data indicative of register mappings used by such speculative instructions that are issued, but yet to be resolved, AND serving to identify (track) instructions which have yet to read registers values for at least some outcomes of the instructions. This reuse of the memory handling speculative instruction recovery to also handle WAR hazards is beneficially efficient.

Consider an instruction storing a value in a register to memory followed by an instruction moving a new value into that register. The store will be treated as speculative as it may be subject to a memory abort and will not be removed from the instruction memory until it has made its read and is passed the point at which it can abort. The following moving instruction will be treated as speculative at least by virtue of following the speculative store instruction. Since the move overwrites the architectural register, the original physical register will continue to hold its value (a recovery value) and be unavailable for use elsewhere until the move is no longer speculative and is removed from the instruction memory. This will necessarily be after the store has read the register value and been removed from the instruction store. Thus preserving the register value for recovery purposes when it is to be overwritten also has the effect of preserving the register value until after it is read.

It will be appreciated that the instructions which the instruction memory stores can take a wide variety of different forms. One example of such an instruction is a load/store instruction using a physical register to store a memory address to be accessed. Such a physical register storing a memory address to be accessed will be preserved as a recovery register if overwritten using register mapping data stored within the instruction memory in association with the later overwriting instruction and so marked as unavailable for mapping until at least after the load/store instruction can no longer be subject to an abort. At that time the physical register storing the memory address will have been read, will not requiring reading again after abort recovery since this is no abort, and accordingly can be overwritten and thus made available for mapping.

Another example of such an instruction which may be stored within the instruction memory is a store instruction using a physical register to store a data value to be stored. If a later instruction overwrites the architectural register concerned, then the physical register will be marked as unavailable as it will be needed as a recovery register since the overwriting instruction will be speculative at least by virtue of following the store instruction and until after the data value has been read from the physical register concerned (it will be appreciated that with such store instructions the data value should be read later than the point of instruction issue where it is conventional for input operands to be read).

A further example of instructions for which register mapping data is stored within the instruction memory is conditional instructions which overwrite at least one existing value corresponding to a value of one of the architectural registers. The physical register which is storing the existing value which is to be overwritten is identified by the register mapping data as unavailable for reuse until the associated conditional instruction is resolved, i.e. if the conditional instruction is properly executed, then the existing value need no longer be maintained, whereas if the conditional instruction is not to be properly executed, then the existing value needs to be used to restore the value associated with the architectural register, e.g. the mapping from the architectural register to the physical register needs to be restored to indicate the existing value in the previous physical register.

Whilst it will be appreciated that the instruction memory can take a variety of different forms and may be of mixed form and composed of multiple components of different character, in some embodiments the instruction memory is a first-in-first-out memory. Such FIFO memories are well suited to storing a sequence of instructions and inherently preserving the ordering of that sequence in a way which facilitates the use of the register mapping data stored within such instruction memories so as to ensure proper operation in accordance with the program instruction sequence of the original program (as preserved by the sequence of instructions within the FIFO memory).

It is convenient to provide an allocated register memory storing data indicating which physical registers are available for mapping and to update such an allocated register memory using the register mapping data for instructions as it is removed from the instruction memory (i.e. at a time after the point at which the circumstances which rendered a particular instruction as speculative or a potential WAR hazard have been resolved). Some embodiments also include a condition code recovery register storing data indicating which physical registers are storing data values to be restored by copying to overwritten physical registers upon a condition code failure. Whilst such data may be recoverable from the register mapping data stored within a FIFO, the provision of such a register having the necessary recovery information present in one place facilitates the provision of a fast hardware mechanism for recovering from condition code failures by using such recovery information since it is then readily readable from a single condition code recovery register.

The allocated register memory and the condition code recovery register memory can be updated as register mapping data for a particular instruction is removed from the instruction memory since at that point the outcome of the instruction will have been resolved and any potential reads of physical registers already made.

Whilst the instruction memory may have utility in its own right as part of a mechanism for avoiding WAR hazards in systems utilizing register renaming, it is of particular usefulness when combined with a mechanism in which the issue stage in the instruction pipeline downstream of the renaming stage is responsive to physical register specifiers of instructions within the issue stage (i.e. yet to be issued) and accordingly unread. Such identification at the issue stage can apply to both speculative and non-speculative instructions, but once an instruction which reads its registers at issue has been issued, any value stored within physical registers will be read at the time of issue and accordingly will no longer be required. In the case of instructions, which may or may not require values stored within the physical registers at a time later than instruction issue, the instruction memory keeps track of those instructions so that later instructions overwriting the architectural register(s) concerned and so preserving those physical register(s) for recovery purposes will not release the recovery register until after the instructions which read them have been completed.

Viewed from another aspect the present invention provides a method of data processing with an apparatus for data processing, said method comprising the steps of:

mapping from register specifiers of an architectural set of register specifiers to registers of a physical set of registers, said architectural set of register specifiers representing registers as specified by instructions within an instruction set and said physical set of registers being physical registers for processing instructions of said instruction set;

storing in an instruction memory register mapping data indicative of register mappings used by instructions that are issued so as to identify physical registers storing values still required for at least some outcomes of said instructions, said register mapping data for an instruction being kept in said memory if said instruction is one or more of an unresolved speculative instruction and yet to read one or more registers; and in response to a current state of said apparatus, identifying which physical registers of said physical set of registers are available to be mapped to a register specifier of an instruction to be processed.

Viewed from a further aspect the present invention provides apparatus for processing data, said apparatus comprising:

a physical set of registers;

register renaming means for mapping from register specifiers of an architectural set of register specifiers to registers of said physical set of registers, said architectural set of register specifiers representing registers as specified by instructions within an instruction set and said physical set of registers being physical registers for processing instructions of said instruction set; and available-register identifying means responsive to a current state of said apparatus for identifying which physical registers of said physical set of registers are available to be mapped by said register renaming logic to a register specifier of an instruction to be processed; wherein said available-register identifying means includes an instruction memory means for storing register mapping data indicative of register mappings used by instructions that are issued so as to identify physical registers storing values still required for at least some outcomes of said instructions, said register mapping data for an instruction being kept in said memory if said instruction is one or more of an unresolved speculative instruction and yet to read one or more registers.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
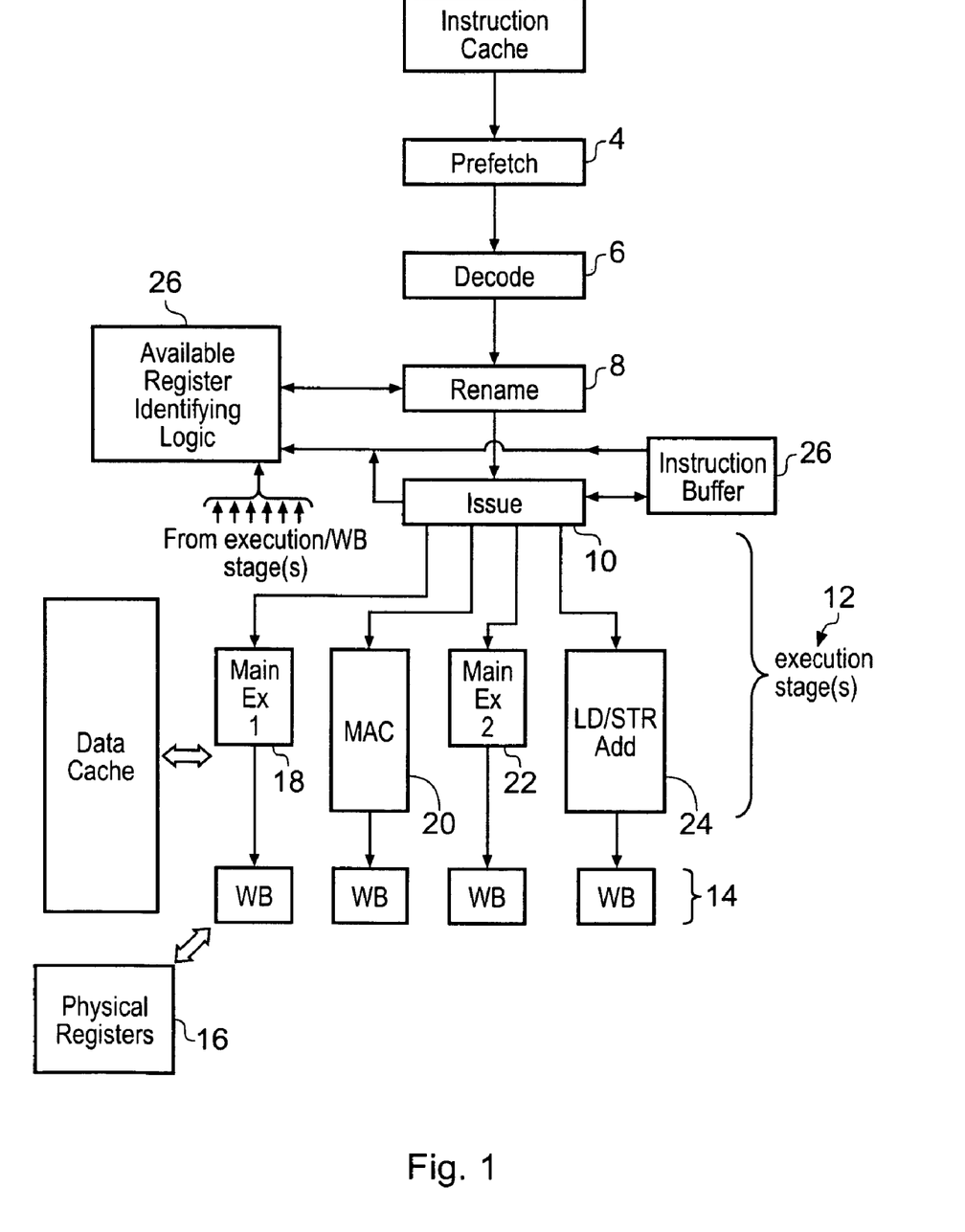
FIG. 1 schematically illustrates a portion of a data processing apparatus including an instruction pipeline supporting out-of-order execution.

FIG. 1 schematically illustrates a data processing apparatus 2 including an instruction pipeline having a prefetch stage 4, a decode stage 6, a renaming stage 8, an issue stage 10, execution stages 12 and writeback stages 14. It will be appreciated that in practice an instruction pipeline may contain additional and/or alternative pipeline stages and that the data processing apparatus 2 may contain many further elements. Such alternative pipeline stages and further elements have been omitted from FIG. 1 for the sake of clarity.

The data processing apparatus 2 includes a set of physical registers 16 which are provided in hardware and support the data processing operations performed by the instruction pipeline, including the execution stages 12. The renaming stage 8 serves to read program instructions to be executed to identify architectural register specifiers therein and then map these architectural register specifiers to physical registers within the set of physical registers 16 which are to be used by the hardware as if they were the architectural register concerned.

As an example, in the ARM processor architecture the general purpose register bank contains sixteen registers R0-R15. Shadow registers are provided for some of these general purpose registers which are swapped into place when moving between processing modes. For example, shadow registers $R0_{fiq}$-$R7_{fiq}$ corresponding to R0-R7 are provided for use in the fast interrupt mode and are swapped in for use when the fast interrupt mode is entered thereby saving the need to store away held in the normal versions of those registers and making registers $R0_{fiq}$-$R7_{fiq}$ immediately available for fast interrupt processing. When such shadow registers are taken into account, the set of architectural registers expands to at least thirty two registers. The architectural registers can be considered to be those which would be apparent within the programmer's mode of the processor concerned taking into account any architectural swapping or duplication such as associated with moving between different processor modes, or between a secure domain and a non-secure domain. The physical registers of the set of physical registers 16 are registers provided in the actual hardware of the data processing apparatus 2. A given architectural register may be mapped to more than one of these physical registers allowing out-of-order processing to be supported providing account is taken of the original program instruction ordering in resolving which physical registers are referenced for a particular program instruction as it is issued.

The issue stage 10 is capable of issuing two instructions in parallel to respective ones of a first main execution path 18, a multiply accumulate unit 20, a second main execution path 22 and a load/store address stage 24. The instructions issued can be out-of-order and an instruction buffer 26 is associated with the issue stage 10 and serves to store pending instructions which have been subject to register renaming in the renaming stage 8, but have not yet been issued by the issue stage 10, due to instruction reordering being performed to reduce the impact of stalls, etc. Whilst described in this example embodiment in the context of an out-of-order system it will be appreciated that the technique may be used elsewhere in combination with register renaming for reasons other than assisting out-of-order execution.

Available register identifying circuitry 26 is associated with the renaming stage 8 and serves to provide an indication to the renaming stage 8 as to which of the set of physical registers 16 are available to be used for mappings by the renaming stage 8 between architectural registers and physical registers. The available register identifying circuitry 26 performs this role using information retrieved from the issue stage 10, the instruction buffer 26 and signals derived from various portions within the execution stages 12 and the writeback stage 14. The available register identifying circuitry 26 also uses information from the renaming stage 8 itself as to which physical registers the renaming stage 8 is currently using as mappings for the architectural registers (i.e. information taken from an architectural to physical mapping (a2p) table employed by the renaming stage 8).

Figure 2:
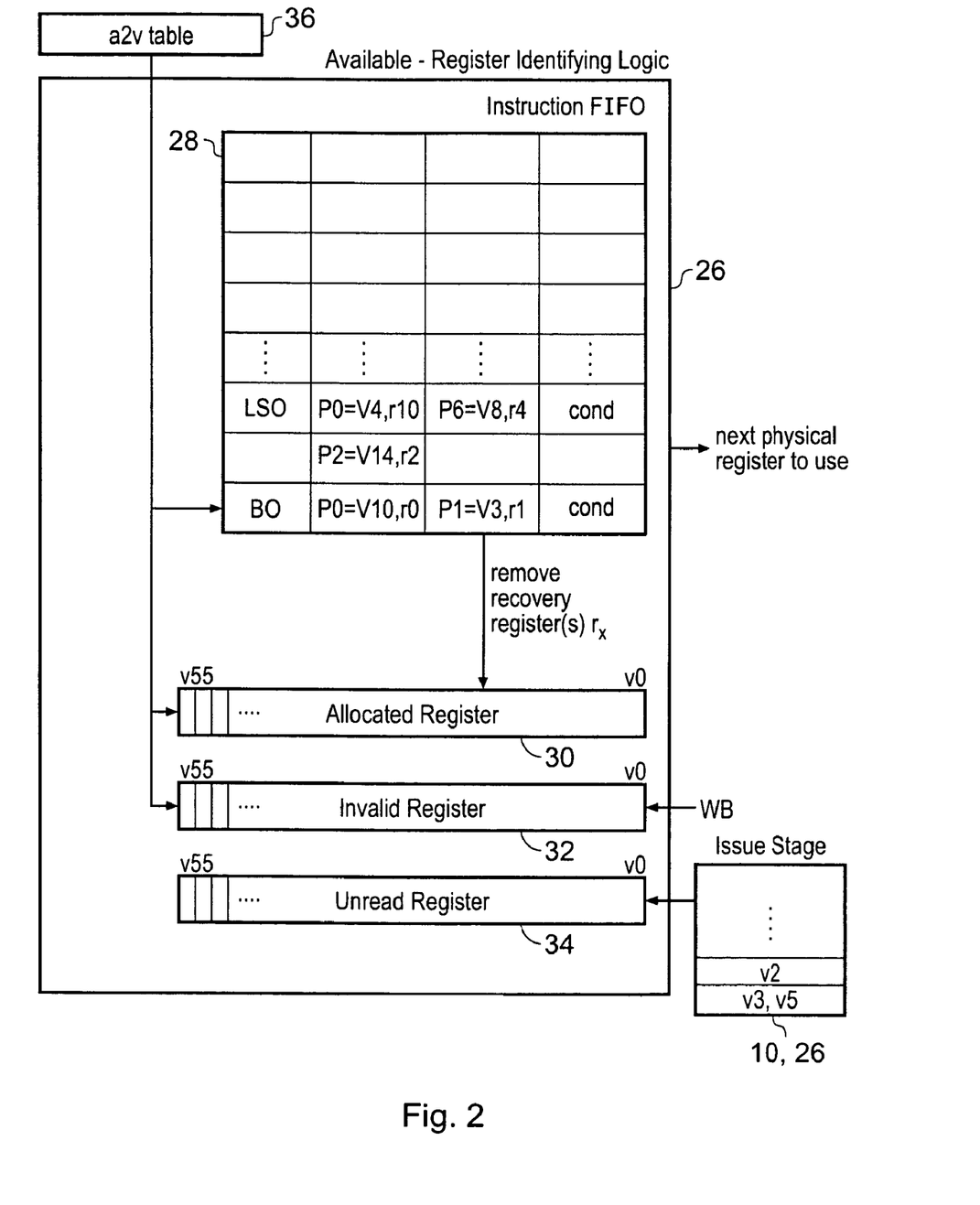
FIG. 2 schematically illustrates available-register identifying circuitry including different memory mechanisms for storing data indicative of whether or not particular physical registers are available for mapping.

FIG. 2 schematically illustrates the available register identifying circuitry 26. This includes an instruction first-in-first-out memory 28, an allocated register memory 30, an invalid register memory 32 and an unread register memory 34. The available register identifying circuitry 26 uses the data stored within these various memories 28, 30, 32, 34 to generate signals passed back to the renaming stage 8 indicating the next physical registers to be used when the renaming stage 8 requires a new physical register for use in mapping to an architectural register. The available-register identifying logic 26 also receives an indication of the current architectural-to-physical mappings being used by the renaming stage 8 from an architectural-to-physical mapping table 36 which is part of the renaming stage 8.

The issue stage 10 provides signals indicative of the physical registers to be read by instructions yet to be issued by the issue stage 10, i.e. either held within the issue stage 10 itself or within the instruction buffer 26, and these are used to set associated bit flags within the unread register memory 34. The unread register memory 34 provides a bit-by-bit flag representation of which of the physical registers (in this example fifty six physical registers) are required to be read by instructions which have been subject to register renaming in the renaming stage 8 but have yet to be issued by the issue stage 10. The invalid register memory 32 similarly stores a bit-by-bit representation for the physical registers as to destination registers for program instructions yet to be completed and accordingly registers for which there is a pending write. Such registers can be identified at the point at which they are mapped to perform the role of a destination register using the architectural to physical mapping table 36 within the renaming stage 38. A destination register can be indicated as validly containing the value which was to be written to it when an appropriate signal is received from the writeback stages 14 indicating that the write to the physical register has actually taken place. It is important to avoid allocating such physical registers for which there are pending writes for use in other mappings until the write has actually taken place so as to avoid WAW hazards and the like.

A physical register is marked as unavailable for mapping within the allocated register memory 30 when it is used as a destination register by the renaming stage 8 as indicated by the architectural to physical mapping table 36. When the instruction concerned is a speculative instruction it is stored within the instruction FIFO 28. If the speculative instruction also overwrites an architectural register, then register mapping data associated with the instruction is also stored within the instruction FIFO 28 to be used for recovery if needed. The instruction which gave rise to any speculative condition itself (e.g. a predicted branch) is stored together with subsequent instructions which are rendered speculative by the behaviour of such a preceding instruction. Other speculative instructions include load/store instructions, which may or may not be subject to a data abort and conditional instructions which may or may not be executed. The register mapping data which can be stored for such instructions includes information indicating which architectural registers "Pn" map to which physical registers "Vn" when a new value is being written together with which recovery registers "rn" are to be used to copy back into the physical register concerned should conditional execution of an instruction turn out to be incorrect. It will be appreciated that multiple mappings and recovery information may be associated with each instruction together with the indication of the conditional nature of that instruction. The instruction FIFO 28 shows an embodiment in which one memory line is associated with each register allocated by each instruction. It is also possible that in other embodiments one line may be associated with each strand of speculative processing.

Figure 3:
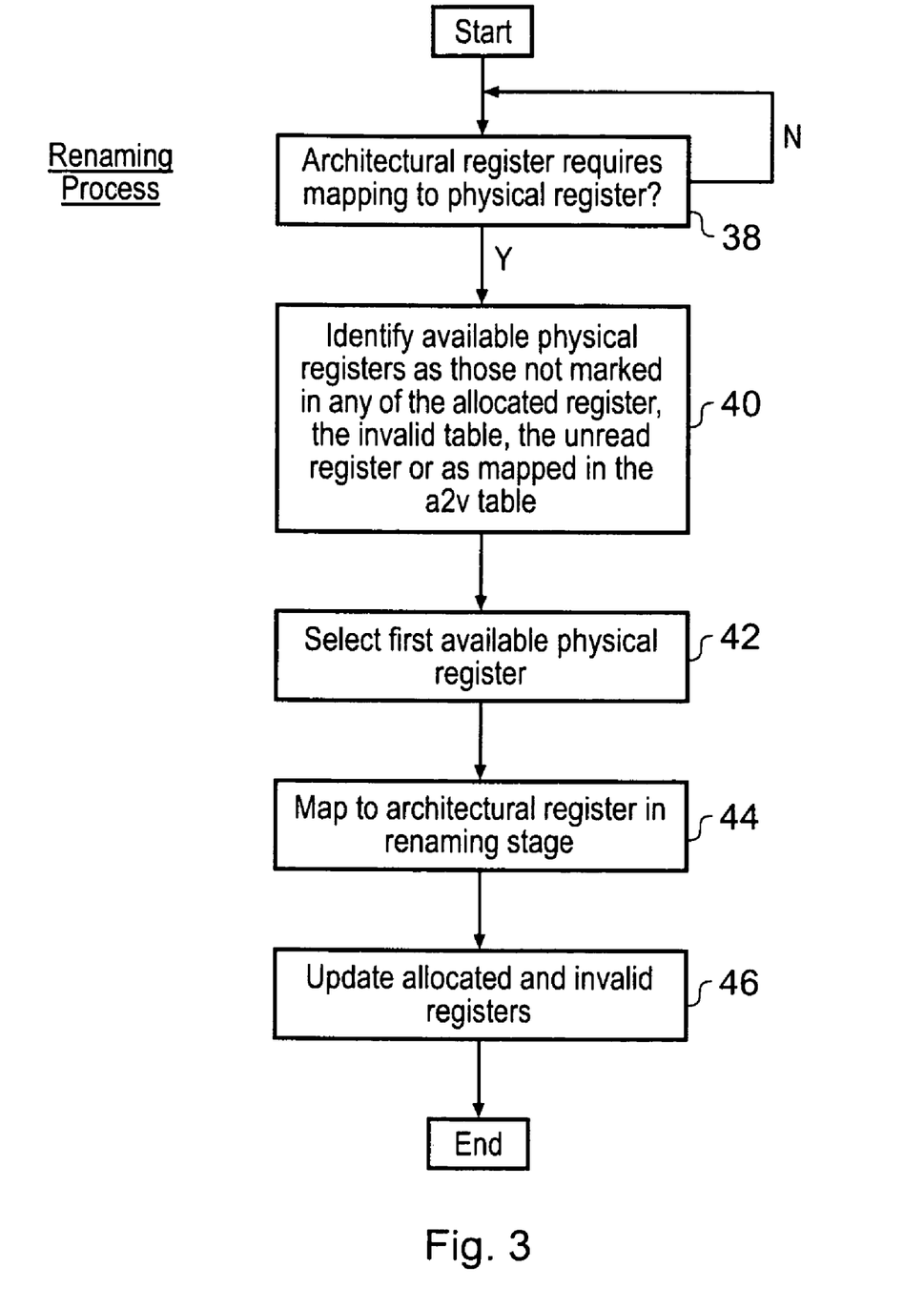
FIGS. 3 to 8 are flow diagrams schematically illustrating the control processes and operation of the hardware of the available-register identifying circuitry of FIG. 2.

FIG. 3 is a flow diagram schematically illustrating the renaming processing performed by the renaming stage 8. At stage 38 the flow loops until an architectural register specifier is identified which requires mapping to a new physical register. At step 40 the available-register identifying circuitry 26 provides an indication of the physical register to be used, i.e. the first of those physical registers which is not marked in any of the allocated register memory 30, the invalid register memory 32, the unread register memory 34 or already used within the architectural to physical mapping table 36.

Step 42 selects the first of these registers and then step 44 establishes the mapping by issuing the instruction from the renaming stage 8 to the issue stage 10 using the physical register specifier in place the architectural register specifier as well as updating the architectural to mapping table 36. At step 46 updates are performed in the instruction FIFO 28, the allocated register memory 30 and the invalid register memory 32 as previously described.

Figure 4:
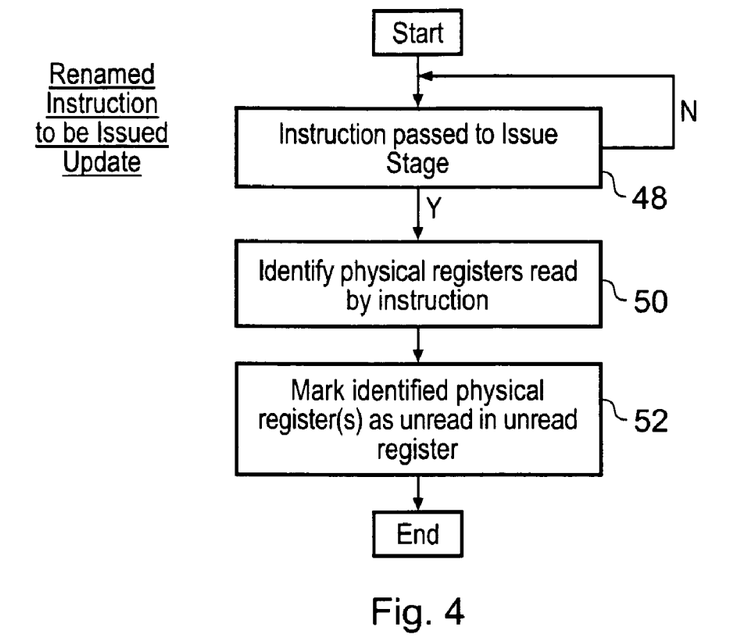

FIG. 4 schematically illustrates the processing performed by the issue stage 10. At step 48 the issue stage waits to receive a remapped instruction from the renaming stage 8. When such a remapped instruction is received, step 50 identifies the physical registers read by the instruction concerned and marks these in the unread register memory 34 at step 52.

Figure 5:
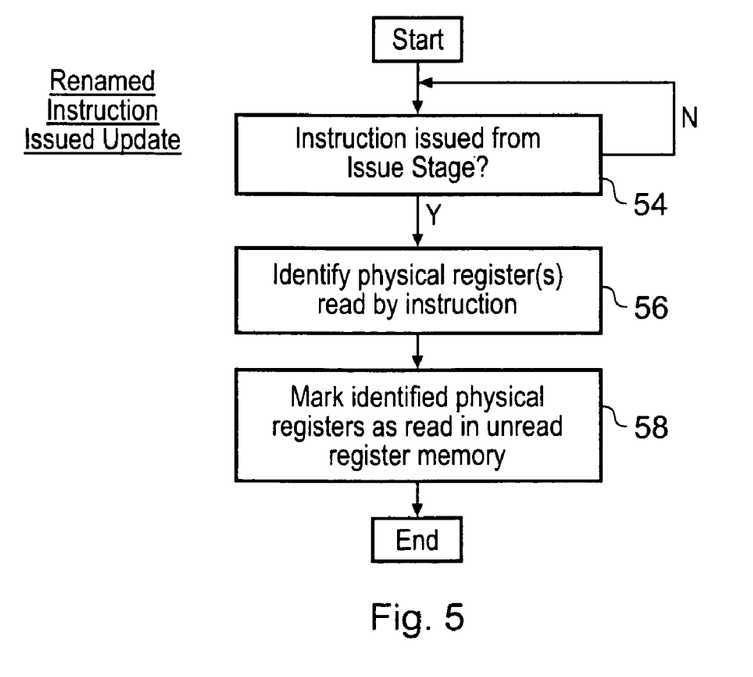

FIG. 5 illustrates the operation of the issue stage 10 when an instruction is issued therefrom. At step 54, the issue stage 10 identifies that an instruction is being issued. At stage 56, the physical registers is read by the instruction being issued and then at step 58 the physical registers concerned are marked as read in the unread register memory 34 and accordingly will no longer be blocked from reuse for this reason. Some instructions will not read registers until a later time and the unread register entries for those instructions will remain until those instructions are removed from the instruction FIFO 28 upon completion.

Figure 6:
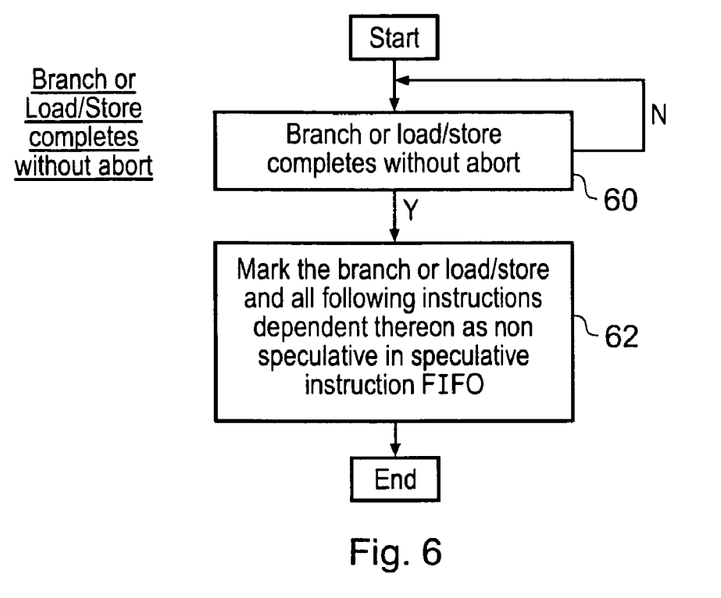

FIG. 6 illustrates the processing performed within the available-register identifying circuitry 26 when a branch or load/store instruction completes without abort (i.e. without a branch misprediction or a memory abort). At step 60, the available-register identifying logic 26 waits to receive signals from the execution stages 12 and writeback stage 14 indicative of whether or not an abort associated with a branch or load/store instruction has occurred. If such an instruction has completed without such an abort, then this is identified at step 60 and processing proceeds to step 62 at which the branch instruction or the load/store instruction concerned, together with all dependent following instructions, are marked within the instruction FIFO memory 28 as no longer being speculative.

Figure 7:
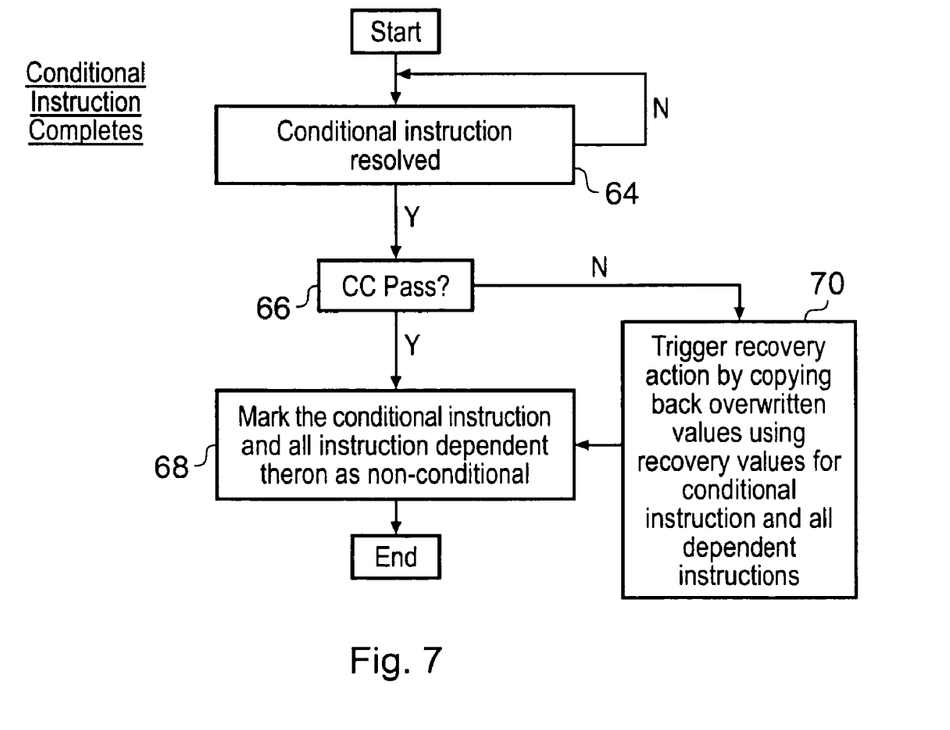

FIG. 7 is a flow diagram illustrating processing performed when a conditional instruction is resolved. Step 64 waits until signals received from the execution stages 12 and the writeback stages 14 of the data processing apparatus 2 indicate that a conditional instruction has been resolved. These signals are passed to the available-register identifying circuitry 26. At step 66, a determination is made as to whether the condition codes associated with the conditional instructions were or were not passed. If the condition codes were passed, then step 68 marks the conditional instruction concerned. Alternatively, if the condition code failed, then processing proceeds to step 68 via step 70 at which recovery operation is triggered to copy back overwritten values associated with the conditional instruction which has failed its condition codes using the recovery values (rn) for the conditional instruction concerned and all dependent instructions. The conditional instruction concerned can then be marked as unconditional by step 68.

Figure 8:
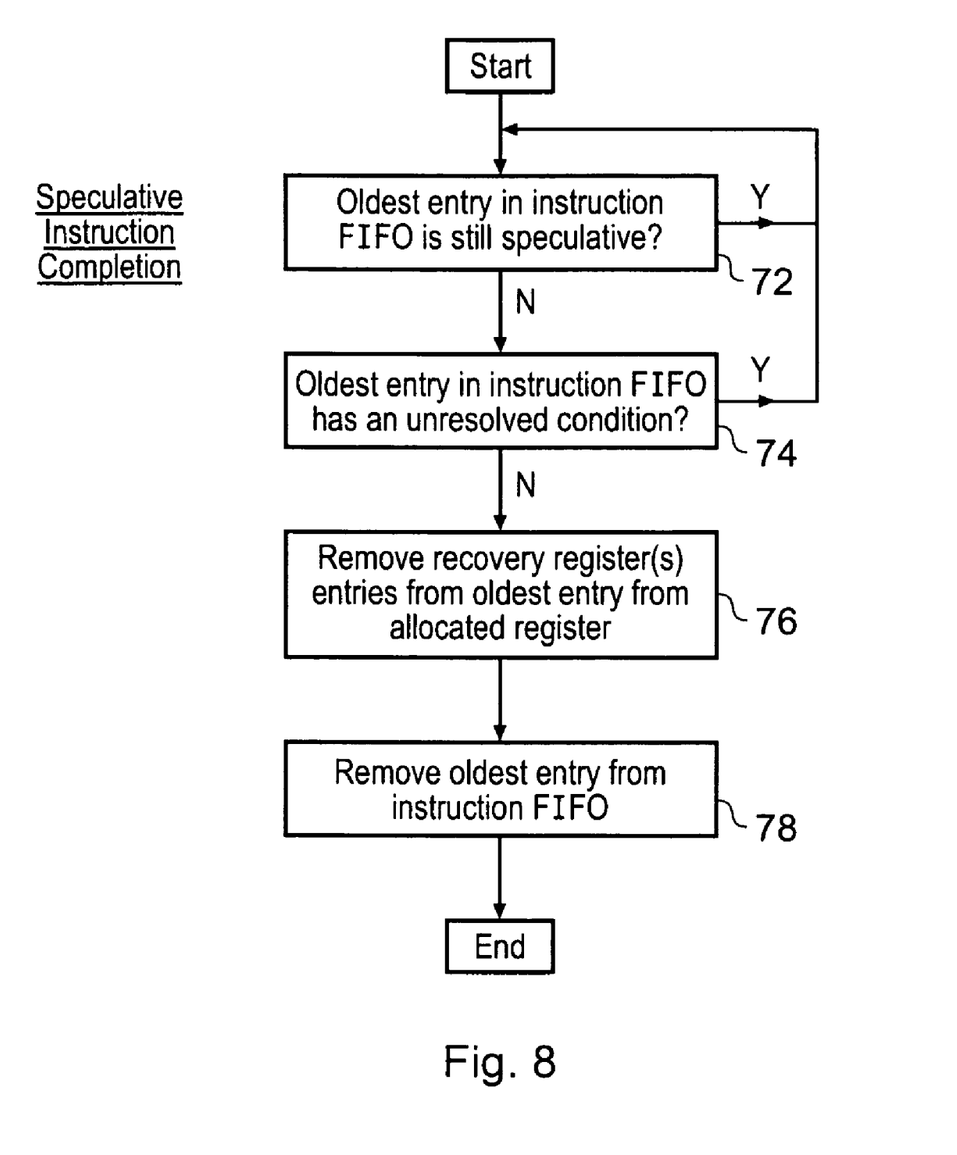

FIG. 8 schematically illustrates the processing performed to remove entries from the instruction FIFO 28. At step 72 a determination is made as to whether the oldest entry within the speculative instruction FIFO 28 is still speculative. If such an entry is not still speculative, i.e. has been marked as non-speculative, such as by the processing of FIG. 6, then processing proceeds to step 74 where a determination is made as to whether or not that oldest entry has an associated unresolved condition i.e. an unresolved condition code or a still pending register read. If any initial condition has not yet been resolved or read not completed, then processing returns to step 72. If however, any initial condition has been dealt with, such as by the processing of FIG. 7, then processing proceeds to step 76. Step 76 reads the recovery registers from the oldest entry in the instruction FIFO 28 and removes these registers from the allocated register memory 30 such that they will no longer be regarded as allocated by virtue of being required for potential recovery operations associated with speculative instructions which are unresolved. Step 78 then removes the oldest entry from the instruction FIFO 28.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   a physical set of registers;
   register renaming circuitry for mapping from register specifiers of an architectural set of register specifiers to registers of said physical set of registers, said architectural set of register specifiers representing registers as specified by instructions within an instruction set and said physical set of registers being physical registers for processing instructions of said instruction set; and
   available-register identifying circuitry, responsive to a current state of said apparatus, for identifying which physical registers of said physical set of registers are available to be mapped by said register renaming circuitry to a register specifier of an instruction to be processed; wherein
   said available-register identifying circuitry includes an instruction memory for storing register mapping data indicative of register mappings used by instructions that are issued so as to identify physical registers storing values still required for at least some outcomes of said issued instructions, said register mapping data for one of said issued instruction is kept in said memory if said one of said issued instructions is an unresolved speculative instruction and is kept in said memory if said one of said issued instructions is an instruction which is yet to read one or more registers.

2. Apparatus as claimed in claim 1, wherein said instruction set includes load/store instructions respectively using a physical register to store a memory address to be accessed, said physical register storing said memory address being identified by said register mapping data as unavailable for mapping at least until said load/store instruction can no longer be aborted.

3. Apparatus as claimed in claim 1, wherein said instruction set includes store instructions respectively using a physical register to store a data value to be stored, said physical register storing said data value being identified by said register mapping data as unavailable for mapping at least until said data value has been read from said physical register.

4. Apparatus as claimed in claim 1, wherein said instruction set includes conditional instructions respectively overwriting at least one existing value corresponding to a value of one of said set of architectural registers, said physical register storing said existing value being identified by said register mapping data as unavailable until said conditional instruction is resolved.

5. Apparatus as claimed in claim 1, wherein said instruction memory is a first-in-first-out memory storing a sequence of speculative instructions.

6. Apparatus as claimed in claim 1, comprising an allocated register memory storing data indicating which physical registers are available for mapping.

7. Apparatus as claimed in claim 6, wherein as register mapping data for one of said issued instructions is removed from said instruction memory, said register mapping data is used to update said allocated register memory.

8. Apparatus as claimed in claim 1, comprising a condition code recovery register memory storing data indicating which physical registers are storing data values to be restored by copying to overwritten physical registers upon a condition code failure.

9. Apparatus as claimed in claim 8, wherein as register mapping data for a conditional instruction is removed from said instruction memory, said register mapping data is used to update said condition code recovery register memory.

10. Apparatus as claimed in claim 1, comprising:
    an instruction pipeline having a renaming stage upstream of an instruction issue stage; wherein
    said available register identifying circuitry includes issue-stage identifying logic for identifying physical registers to be read by instructions when issued from said issue stage and accordingly being unavailable for mapping.

11. Apparatus as claimed in claim 10, wherein said issue stage includes an instruction buffer for storing instructions that have been subject to register renaming in said renaming stage but are not yet issued from said issue stage and said issue-stage identifying circuitry is responsive physical register specifiers of instructions stored within said instruction buffer.

12. A method of data processing with an apparatus for data processing, said method comprising the steps of:
    mapping from register specifiers of an architectural set of register specifiers to registers of a physical set of registers, said architectural set of register specifiers representing registers as specified by instructions within an instruction set and said physical set of registers are physical registers for processing instructions of said instruction set;
    storing in an instruction memory register mapping data indicative of register mappings used by instructions that are issued so as to identify physical registers storing values still required for at least some outcomes of said issued instructions, said register mapping data for at least one issued instruction is kept in said memory if said issued instruction is an unresolved speculative instruction and is kept in said memory if said issued instruction is an instruction which is yet to read one or more registers; and in response to a current state of said apparatus, identifying which physical registers of said physical set of registers are available to be mapped to a register specifier of an instruction to be processed.

13. A method as claimed in claim 12, wherein said instruction set includes load/store instructions respectively using a physical register to store a memory address to be accessed, said physical register storing said memory address being identified by said register mapping data as unavailable for mapping at least until said load/store instruction can no longer be aborted.

14. A method as claimed in claim 12, wherein said instruction set includes store instructions respectively using a physical register to store a data value to be stored, said physical register storing said data value being identified by said register mapping data as unavailable for mapping at least until said data value has been read from said physical register.

15. A method as claimed in claim 12, wherein said instruction set includes conditional instructions respectively overwriting at least one existing value corresponding to a value of one of said set of architectural registers, said physical register storing said existing value being identified by said register mapping data as unavailable until said conditional instruction is resolved.

16. A method as claimed in claim 12, wherein said instruction memory is a first-in-first-out memory storing a sequence of speculative instructions.

17. A method as claimed in claim 12, wherein an allocated register memory stores data indicating which physical registers are available for mapping.

18. A method as claimed in claim 17, wherein as register mapping data for one of said issued instructions is removed from said instruction memory, said register mapping data is used to update said allocated register memory.

19. A method as claimed in claim 12, wherein a condition code recovery register memory stores data indicating which physical registers are storing data values to be restored by copying to overwritten physical registers upon a condition code failure.

20. A method as claimed in claim 19, wherein as register mapping data for a conditional instruction is removed from said instruction memory, said register mapping data is used to update said condition code recovery register memory.

21. A method as claimed in claim 12, wherein said apparatus comprises an instruction pipeline having a renaming stage upstream of an instruction issue stage and said method further comprises the step of:
identifying physical registers to be read by instructions when issued from said issue stage and accordingly being unavailable for mapping.

22. A method as claimed in claim 21, wherein said issue stage includes an instruction buffer for storing instructions that have been subject to register renaming in said renaming stage but are not yet issued from said issue stage and said identifying of physical instructions to be read is responsive physical register specifiers of instructions stored within said instruction buffer.

23. Apparatus for processing data, said apparatus comprising:
a physical set of registers;
register renaming means for mapping from register specifiers of an architectural set of register specifiers to registers of said physical set of registers, said architectural set of register specifiers representing registers as specified by instructions within an instruction set and said physical set of registers being physical registers for processing instructions of said instruction set; and
available-register identifying means, responsive to a current state of said apparatus, for identifying which physical registers of said physical set of registers are available to be mapped by said register renaming logic to a register specifier of an instruction to be processed; wherein
said available-register identifying means includes an instruction memory means for storing register mapping data indicative of register mappings used by speculative instructions that are issued so as to identify physical registers storing values still required for at least some outcomes of said issued instructions, said register mapping data for one of said issued instructions is kept in said memory if said one of said issued instructions is an unresolved speculative instruction and is kept in said memory if said one of said issued instructions is an instruction which is yet to read one or more registers.

* * * * *